INVENTORS
JACK HUEBLER
JAMES L. JOHNSON
FRANK C. SCHORA, JR.
PAUL B. TARMAN

United States Patent Office 3,442,619
Patented May 6, 1969

3,442,619
PRODUCTION OF HYDROGEN VIA THE STEAM-IRON PROCESS UTILIZING DUAL SOLIDS RECYCLE
Jack Huebler, Deerfield, James L. Johnson, Oak Park, Frank C. Schora, Jr., Palatine, and Paul B. Tarman, Elmhurst, Ill., assignors to Consolidation Coal Company, Pittsburgh, Pa., a corporation of Delaware
Continuation-in-part of application Ser. No. 477,512, Aug. 5, 1965. This application Mar. 27, 1968, Ser. No. 716,569
Int. Cl. C01b 1/08
U.S. Cl. 23—214   13 Claims

ABSTRACT OF THE DISCLOSURE

An improved process for making hydrogen by the steam-iron reaction in which a dual solids system is used to effect the oxidation of Fe to $Fe_3O_4$ in two oxidation steps, namely Fe to FeO and FeO to $Fe_3O_4$, and also the reduction of the resulting oxides in two separate steps.

---

Figure 1:
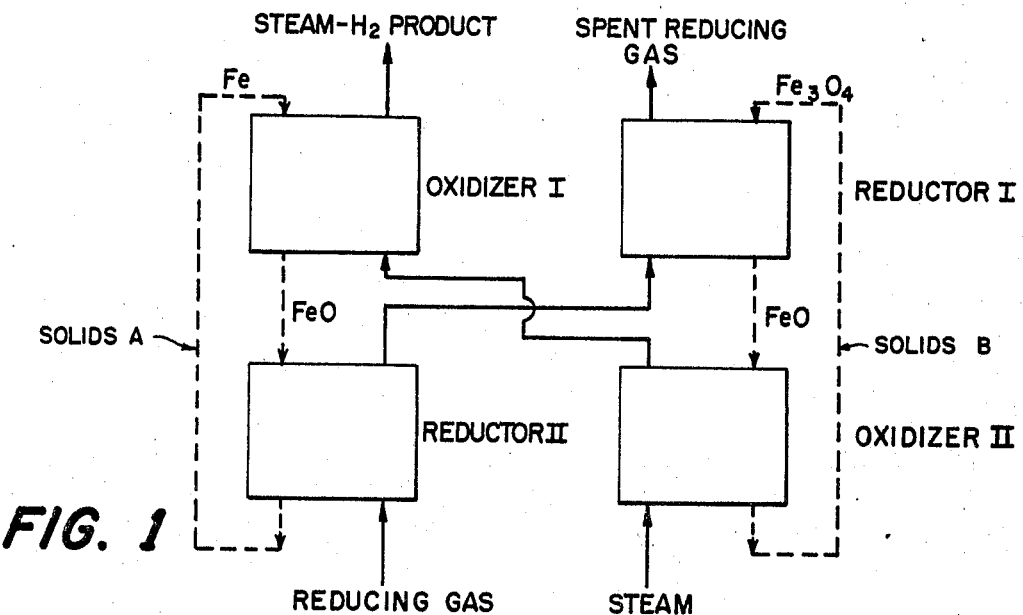

This application is a continuation-in-part of our copending application Ser. No. 477,512 filed Aug. 5, 1965, now abandoned.

This invention relates to the production of hydrogen and steam-hydrogen mixtures for use in synthesis processes, such as the production of ammonia, methane, or other products of hydrogenation processes. In particular, this invention relates to the production of hydrogen by an improved dual cycle steam-iron process wherein hydrogen is produced efficiently and in maximized yields.

The art has sought methods of producing hydrogen gas in large quantities for use in processes as noted above. For example, at present, hydrogen is obtained in most instances by reforming methane (natural gas) with steam. However, methane reformation is not so attractive for hydrogen production since the product gases contain not only hydrogen but also carbon monoxide, carbon dioxide, methane, and steam, which gases must be treated in conventional carbon monoxide shift and carbon dioxide removal equipment to achieve a final gas product rich in hydrogen.

There are also known processes for producing hydrogen which use the steam-iron reaction wherein steam is reacted with elemental iron or lower oxides of iron to produce hydrogen and iron oxides. The resultant iron oxides are then reduced with a reducing gas, usually containing carbon monoxide and hydrogen, to produce elemental iron and lower oxides. There have been proposed various fixed and fluidized bed cyclic processes, all of which suffer from poor hydrogen conversion due to improper design from thermodynamic and equilibrium considerations.

For example, Parsons in U.S. Patent 1,658,939 describes a process wherein elemental iron is oxidized by steam to form FeO; and the formation of $Fe_3O_4$ is specifically avoided by low temperature operation. This process results in unduly low hydrogen production and is commercially unattractive.

Marshall in U.S. Patent 2,182,747 describes a steam-iron process using as an oxidizing agent liquid water under pressure at 450° to 700° F. High hydrogen yields are not commercially feasible with this process because of equilibrium limitations in the operation of a liquid-gas phase system.

Benson et al. in U.S. Patent 3,031,287 describe a steam-iron process for making synthesis gas containing hydrogen which ultilizes as an oxidizing agent a gaseous mixture of carbon dioxide and steam at relatively low pressures. This process is for the production of gas mixtures containing primarily $H_2$, CO, and mixtures thereof.

It is thus an object of this invention to produce hydrogen by a dual solids cycle steam-iron process wherein there is effected a high ultilization of the reducing gas in reduction of the iron oxide solids.

It is a further object of this invention to produce hydrogen by a dual solids cycle steam-iron process wherein the oxidation and reduction phases of the process are effected at relatively high pressure to attain high reaction rates and rapid approaches to equilibrium.

It is yet another object of this invention to produce hydrogen by a dual solids cycle steam-iron process wherein the oxidation and reduction phases of the process are effected separately and continuously at conditions which provide nearly equilibrium conversions of steam and reducing gas.

It is yet another object of this invention to produce hydrogen by a dual solids cycle steam-iron process wherein the oxidation and reduction phases are effected continuously in separate reactors in which the oxidation and reduction phases each occur in step-wise fashion in two distinct reactors wherein gas-solids contact is either countercurrent or cocurrent.

Figure 2:
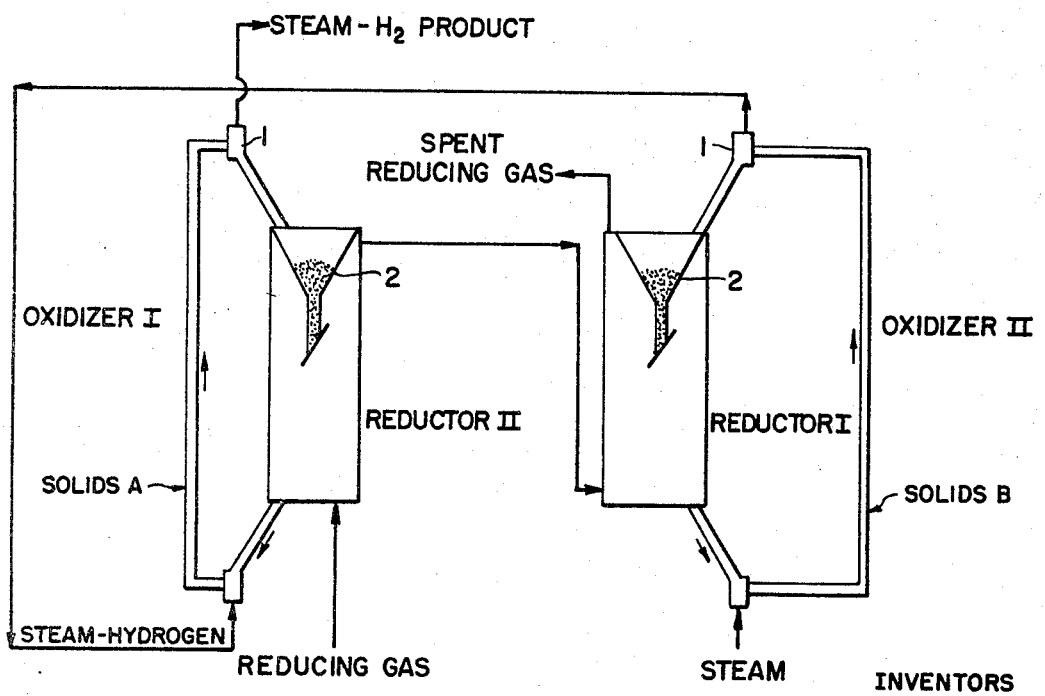

Other objects will become apparent as the invention is more fully described hereinafter. In the drawings:

FIGURE 1 is a diagram showing the process of one embodiment of the invention illustrating countercurrent gas-solids contact; and FIGURE 2 is a diagram showing the process of another embodiment of the invention illustrating part countercurrent, part cocurrent gas-solids contact.

In the process of this invention, hydrogen is produced by oxidation of reduced iron solids with steam. The resulting product gas, hydrogen and unreacted steam, is essentially free of other contaminants. The steam used in the oxidation phase may also be admixed with noncondensable gases such as nitrogen or carbon dioxide. The oxidation is effected in two separate reactors with one oxidation stage occurring in each reactor; in the first stage, elemental iron is oxidized to FeO, and in the second stage, FeO is oxidized to $Fe_3O_4$. In this disclosure, we denote the lower oxide of iron as FeO. As is well known in the art, the ratio of Fe to O in this oxide is slightly less than one, and this ratio will vary depending on the gas composition with which it is in equilibrium. Iron solids in the oxidation reactors can be contacted either cocurrently or countercurrently with gases as hereinafter more fully described. A continuous supply of reduced iron solids for the oxidation stages is provided by subsequent reduction of the oxidized iron solids with a reducing gas. Reduction is also effected in two separate reactors with one reduction stage occurring in each reactor. In the first stage, $Fe_3O_4$ is reduced to FeO, and in the second stage, FeO is reduced to elemental iron. Iron solids in the reduction reactors can be contacted either countercurrently or cocurrently with gases as hereinafter more fully described.

Thus, the essence of our invention is the separation of the solids phase reactions described above to yield higher reducing gas and steam conversions.

The reducing gas used in the reduction reaction need only contain carbon monoxide and/or hydrogen in sufficient quantities to reduce oxidized iron solids. The presence of other constituents in the reducing gas such as nitrogen, steam, carbon dioxide, methane, etc., does not affect the quality of hydrogen produced in the oxidation step. Thus, the reducing gas can be obtained from the least expensive and/or the most convenient source, such as the partial oxidation of coal, methane, shale oil, or other hydrocarbons with air or a mixture of steam and air, or with such gases as may be obtained by retorting oil shale. The air or air-steam mixture may also contain carbon dioxide. In addition, we have found that it is advantageous for the reducing gas to contain small quantities of sulfur compounds which inhibit formation of free carbon. A suitable tail gas from other plant operations can be used as the reducing gas.

In carrying out the process of this invention, there are employed four reaction vessels: a first and second oxidizer, where reduced iron solids are contacted with oxidizing gas; and a first and second reductor, where the oxidized iron solids are contacted with reducing gas. For continuous operation, it is necessary to recycle the iron solids from the oxidizers to the reductors. The equipment required for the transfer of solids can be of any type, mechanical or pneumatic, available to all industrial processes. When employing the embodiment as illustrated in FIGURE 2, the solids recycle lines serve as the oxidizers.

In solids recycle systems, such as is utilized here, it is essential that cyclic solids conversion be exactly balanced with respect to all solids phases. If not balanced, the solids will tend to yield high reduction or high oxidation levels which limit solids reaction rates and gas conversions in the oxidizer or reductor.

Hydrogen production via cyclic steam-iron processes has been used in the past with fixed, fluidized, moving, and free-fall beds. Both cocurrent and countercurrent gas-solids contact systems have been employed. However, in all cases heretofore, only one solids stream has been utilized. Because of thermodynamics of the steam-iron process, this single solids stream is composed of three separate solids phases, elemental iron (Fe), wustite (FeO), and magnetite ($Fe_3O_4$). Therefore, six different reactions are possible, four in reduction and two in oxidation:

(1) $Fe_3O_4 + H_2 = 3FeO + H_2O$  $K_1 = PH_2O/PH_2$
(2) $Fe_3O_4 + CO = 3FeO + CO_2$  $K_2 = PCO_2/PCO$
(3) $FeO + H_2 = Fe + H_2O$  $K_3 = PH_2O/PH_2$
(4) $FeO + CO = Fe + CO_2$  $K_4 = PCO_2/PCO$
(5) $Fe + H_2O = FeO + H_2$  $K_5 = PH_2/PH_2O$
(6) $3FeO + H_2O = Fe_3O_4 + H_2$  $K_6 = PH_2/PH_2O$

Reactions (1) and (2) favor high-reducing gas conversion and reaction (5) favors high-steam conversion. To insure high-gas conversion and a sufficient feed supply of metallic iron to the oxidizer and magnetite to the reductor, it is necessary that countercurrent gas-solids contact be employed in single solids systems. Furthermore, if reactions (1) and (2) occur at low reducing gas conversions [where the $H_2O/H_2$ and $CO_2/CO$ ratios are below the respective equilibrium values for reactions (3) and (4)], the supply of elemental iron to the oxidizer will be limited. This is true because the amount of reducing gas converted by reactions (3) and (4) has been proportionately decreased. If in oxidation, reaction (5) occurs at low steam conversions [below the equilibrium value for reaction (6)], the supply of magnetite to the reductor will be curtailed. These stoichiometric limitations can significantly decrease reducing gas and/or steam conversions.

There is described in our copending application Ser. No. 477,511, filed Aug. 5, 1965 and now abandoned, a cyclic system utilizing two reactors where countercurrent contact of gas and solids is required. There is also described in our aforementioned application the equilibrium and thermodynamic details of above reactions (1) to (6) with equilibrium constants and diagrams set out. The details thereof apply as well to the process of this invention, and the disclosure regarding equilibrium considerations is thus incorporated by reference herein.

The novel use of a dual solids system described in this application overcomes the limitations of using only a single solids cycle system, and allows high gas conversions in either cocurrent or countercurrent operation. The dual solids system effects separation of the three solids phases of iron such that one system (called solids system A, herein) contains elemental iron (Fe) and wustite (FeO), and the other system (called solids system B, herein) contains wustite (FeO) and magnetite ($Fe_3O_4$). Preferably, each of the two solids systems consists essentially of the solids specified. However, as a practical matter, other reactive or nonreactive solids may be present without seriously affecting the practice of our invention. It is essential that the principal reactive constituents of the designated system be the solids specified. Each solids system utilizes a reductor and an oxidizer as shown in FIGURE 1, i.e. solids system A utilizes Reductor II and Oxidizer I, and solids system B utilizes Reductor I and Oxidizer II. In Reductor II, reducing gas contacts solids A to attain equilibrium with respect to Fe-FeO (low reducing gas conversion), and in Reductor I, the reducing gas is contacted with solids B where high reducing gas conversion is attained due to the reduction of magnetite. In Oxidizer II, steam contacts solids B to attain equilibrium with respect to $FeO-Fe_3O_4$ (low steam conversion), and in Oxidizer I, the steam-hydrogen mix is contacted with solids A where high steam conversion is attained due to the presence of elemental iron. Thus, principally reactions (3) and (4) occur in Reductor II, reactions (1) and (2) in Reductor I, reaction (6) in the Oxidizer II and reaction (5) in Oxidizer I.

Because of the separation of phases, one essential solids phase reaction occurs in each reactor: $Fe \rightleftarrows FeO$ in solids system A, and $FeO \rightleftarrows Fe_3O_4$ in solids system B. There can, therefore, be little or no loss of elemental iron production due to the reduction of magnetite to wustite in Reductor II. This separation also provides a means of more efficient design. Each reactor can be sized according to known kinetics of the particular solids phase reaction taking place. In single solids cycle systems, the oxidizer and reductor must be sized to accommodate the complicated kinetic mechanisms for two different solids phase changes.

Although countercurrent gas-solids contact is illustrated in FIGURE 1, full or partial cocurrent operation is just as efficient, because the separation of solids phases insures sufficient feeds of elemental iron and magnetite to Oxidizer I and Reductor I, respectively.

FIGURE 2 illustrates an embodiment of the process of the invention wherein reduction is effected countercurrently in Reductors I and II and oxidation is effected cocurrently in the solids recycle lines indicated as Oxidizers I and II. Gas streams are fed into and out of the oxidizers and reductors as shown in FIGURE 2. Solids A are recycled between Reductor II and Oxidizer I, and solids B are recycled between Reductor I and Oxidizer II. The solids in Oxidizers I and II are transported up through the oxidation zones by steam-hydrogen and steam, respectively, so that the gas and solids are transported in cocurrent relation. At the top of the oxidizers are separators 1, shown diagrammatically, such as cyclone separators by which the gas and solids are disengaged. Solids are then fed to hoppers 2 for subsequent further reacting in the respective reductors.

We have found several types of iron-bearing solids suitable for this system, such as siderite, magnetite, and hemetite ores (either raw or beneficiated), ammonia synthesis catalysts, iron ore sinters, as well as other commercially available iron compounds. The preferable particle size range for this process is from 10 to 325 mesh, preferably 40 to 100 mesh.

With these iron-bearing solids, particle residence times in the range of 5 to 180 seconds, preferably 10 to 45 seconds, are sufficient to effect the necessary gas and solids conversions in each reactor. Operating temperature significantly affects reducing gas conversion in Reductor I and steam conversion in Oxidizer II, but has only slight effect on gas conversions in solids system A. Therefore, operation of solids system B at a higher temperature than solids system A can be beneficial to gas conversions. However, it may be necessary, in this type of operation, to adjust the temperature of the feed gases to the first stage reactors so that the steam-hydrogen fed to Oxidizer I will not oxidize wustite and the reducing gas mixture fed to Reductor I will not reduce wustite. Otherwise, the two-phase solids system would be destroyed. We have found that temperatures in the range of 1000° to 2000° F. allow sufficiently high reaction rates so that high steam and reducing gas conversions will result. More preferable ranges are 1000° to 1500° F. for oxidation and 1300° to 2000° F. for reduction. Higher reduction temperatures can cause agglomeration of some iron-bearing solids, especially those high in total iron content, such as ammonia synthesis catalysts. For these types of solids, the solids free-fall bed is best suited since low solids densities in the range of 2 to 30 lbs./cu. ft. can be used effectively. With non-agglomerating solids, any type of bed can be used, and for all solids, either cocurrent or countercurrent operation is suitable.

Solids/gas ratios in the range of 0.1 to 5 lbs. solids/s.c.f. active gas are adaptable to this process, but this ratio does depend upon the reaction rates obtained and upon the heat requirements of the individual solids system. More preferable solids/gas ratios are 0.3 to 2 lbs. solids/s.c.f. active gas. Incremental solids conversions most beneficial to this process range from 0.25 to 15, preferably from 0.5 to 10 lbs. oxygen transferred per 100 lbs. solids fed to each reactor.

We have found that reaction rates increase with pressure up to about 200 p.s.i.g. Therefore, operation above this pressure, say 200 to 2500 p.s.i.g., can significantly decrease the required size of each reactor. In addition, gas residence time increases with pressure and in countercurrent, solids free-fall reactors, the residence time of the solids is increased due to the lower terminal velocity of particles in denser gases.

An example is given in the following table of operating conditions and results for conversion of a typical reducing gas. The various gas and solids stream compositions noted are for a system as shown in FIGURE 1, the solids used being a commercial ammonia synthesis catalyst of 40–100 mesh.

We have found that the addition of methane to the reducing gas can increase its reducing potential by the following probable reactions:

(7) $$CH_4 + H_2O = CO + 3H_2$$

(8) $$CH_4 + Fe_3O_4 = 3FeO + CO + 2H_2$$

The temperature of the feed reducing gas can be increased to supply the endothermic heat of these reactions if methane is added to the reductors. Product gases can also be burned with air injected at the top of Reductor I for this purpose. The heat of combustion can thus be used to impart heat to the incoming solids and thereby maintain Reductor I temperature.

We have also found that the addition of sulfur compounds, such as hydrogen sulfide, to the feed reducing gas is beneficial to the process. Hydrogen sulfide concentrations of 0.1 to 0.5 percent inhibit the formation of free carbon thus eliminating subsequent loss in reducing quality of the reducing gas.

In actual commercially sized equipment, some heat losses from the system can be expected. Reasonable equipment design should limit these losses to less than 5 percent of the heat input to the system, in this case the enthalpy input of the feed gas streams. Therefore, to maintain optimum temperature gradients in the reactors, higher inlet gas temperatures can be used as a convenient source of additional enthalpy. However, only enough additional enthalpy to balance heat losses should be provided, otherwise higher than optimum operating temperatures will result.

There are other possible variations of this system, as can be seen by those skilled in the art. All, however, should be considered within the scope of this invention which is limited solely by the appended claims.

We claim:
1. Process for producing hydrogen comprising:
 (1) reacting $Fe_3O_4$ with a reducing gas in a first reduction zone, and FeO with a reducing gas in a second reduction zone, whereby $Fe_3O_4$ is reduced to FeO in said first reduction zone and FeO is reduced to Fe

TABLE I.—GAS COMPOSITIONS AND FLOW RATES

| Gas | Reductor | | | Oxidizer | | Steam-$H_2$ Product |
|---|---|---|---|---|---|---|
| | Stage II Feed | Stage I Feed | Spent Gas | Stage II Feed | Stage I Feed | |
| Temperature, °F | 1,510 | 1,500 | 1,500 | 1,100 | 1,290 | 1,500 |
| S.c.f./hr | 10,000 | 10,000 | 10,000 | 4,130 | 4,130 | 4,130 |
| Composition, mole percent: | | | | | | |
| CO | 21.4 | 17.0 | 7.8 | | | |
| $CO_2$ | 4.5 | 8.9 | 18.1 | | | |
| $H_2$ | 20.2 | 17.2 | 7.9 | | 44.7 | 62.5 |
| $H_2O$ | 6.0 | 9.0 | 18.3 | 100.0 | 55.3 | 37.5 |
| $N_2$ | 47.9 | 47.9 | 47.9 | | | |
| Total | 100.0 | 100.0 | 100.0 | 100.0 | 100.0 | 100.0 |
| | To Stage II | To Stage I | | To Stage II | | To Stage I |
| Solids, moles/hr.: | | | | | | |
| $Fe_3O_4$ | | 8.8 | | 3.0 | | |
| FeO* | 57.8 | | | 18.3 | | 55.9 |
| Fe | | | | | | 1.8 |
| Temperature, °F | 1,500 | 1,500 | | 1,290 | | 1,500 |

*Assumed as $Fe_{0.95}O$.

In the system embodiment, shown in FIGURE 2, the steam and reducing gas flow patterns could have been interchanged, that is, countercurrent oxidation and cocurrent reduction could have been used. However, it is known that the rate of oxidation is faster than the rate of reduction and since lift flow rates (both gas and solids) are usually maintained high to yield smooth operation, residence times are necessarily low. Thus, the faster oxidation reactions should preferably be carried out in the lift-reactors.

This latter system variation has several other advantages. For instance, total reactor heights are about half those for the system shown in FIGURE 1. Thus, differential lift pressures are smaller, hence solids legs are also shorter.

in said second reduction zone, and
 (2) reacting the resultant reduced solid products from each of said reduction zones separately with steam at a temperature from 1000° to 2000° F., whereby Fe is oxidized to FeO in a first oxidation zone, and FeO is oxidized to $Fe_3O_4$ in a second oxidation zone; and
 wherein two separate solids systems are utilized in such a manner that one system (solids B) containing FeO and $Fe_3O_4$ is recycled between the first reduction zone and the second oxidation zone, and the other system (solids A) containing Fe and FeO is recycled between the second reduction zone and the first oxidation zone; wherein in step (1) fresh reducing gas is contacted with solids A containing FeO in said second reduction zone to produce Fe and the resulting gas is contacted with solids B containing $Fe_3O_4$ in said first reduction zone of produce FeO; and wherein in step (2) feed steam is contacted with solids B containing FeO in said second oxidation zone to produce $Fe_3O_4$ and the resulting gas is contacted with solids A containing Fe in said first oxidation to produce FeO, thereby producing hydrogen.

2. Process for producing hydrogen comprising:
   (1) reacting $Fe_3O_4$ with a reducing gas in a first reduction zone, and FeO with a reducing gas in a second reduction zone, whereby $Fe_3O_4$ is reduced to FeO in said first reduction zone and FeO is reduced to Fe in said second reduction zone, and
   (2) reacting the resultant reduced solid products from each of said reduction zones separately with steam at a temperature from 1000° to 2000° F., whereby Fe is oxidized to FeO in a first oxidation zone, and FeO is oxidized to $Fe_3O_4$ in a second oxidation zone; and wherein two separate solids systems are utilized in such a manner that one system (solids B) containing principally FeO and $Fe_3O_4$ is recycled between the first reduction zone and the second oxidation zone, and the other system (solids A) containing principally Fe and FeO is recycled between the second reduction zone and the first oxidation zone; wherein in step (1) fresh reducing gas is contacted with solids A containing FeO in said second reduction zone to produce Fe and the resulting gas is contacted with solids B containing $Fe_3O_4$ in said first reduction zone to produce FeO; and wherein in step (2) feed steam is contacted with solids B containing FeO in said second oxidation zone to produce $Fe_3O_4$ and the resulting gas is contacted with solids A containing Fe in said first oxidation zone to produce FeO, thereby producing hydrogen.

3. Process of claim 2 wherein the residence time of solids in each zone is 5 to 180 seconds.

4. Process of claim 2 wherein flow between solids and gases in at least one of the zones is countercurrent.

5. Process of claim 4 wherein said countercurrent flow is conducted using a free-fall bed.

6. Process of claim 2 wherein flow between solids and gases in at least one of the zones is cocurrent.

7. Process of claim 2 wherein the reducing gas contains carbon monoxide and hydrogen.

8. Process of claim 7 wherein said reducing gas also contains methane.

9. Process of claim 7 wherein said reducing gas also contains sulfur compounds in sufficient quantity to inhibit the formation of free carbon.

10. Process of claim 8 wherein air is injected into the first reduction reactor to combust a portion of the spent reducing gas to supply the necessary additional heat to offset the endothermic methane consuming reactions.

11. Process of claim 2 wherein the temperature of the oxidation zones is between 1000 and 1500° F. and the temperature of the reduction zones is between 1300 and 2000° F.

12. Process of claim 2 wherein steps (1) and (2) are conducted at a pressure minimally 200 p.s.i.g.

13. Process of claim 2 wherein the solids system B is maintained at a higher temperature than solids system A.

References Cited

UNITED STATES PATENTS

| | | | |
|---|---|---|---|
| 1,345,905 | 7/1920 | Abbott | 23—214 |
| 2,449,635 | 9/1948 | Barr | 23—214 |
| 3,027,238 | 3/1962 | Watkins | 23—214 XR |
| 3,031,287 | 4/1962 | Benson et al. | 23—214 XR |
| 3,076,702 | 2/1963 | Hemminger | 23—214 |

FOREIGN PATENTS

| | | |
|---|---|---|
| 142,375 | 7/1951 | Australia. |
| 143,884 | 10/1951 | Australia. |
| 617,400 | 3/1961 | Canada. |
| 902,338 | 8/1962 | Great Britain. |

EDWARD STERN, *Primary Examiner.*

U.S. Cl. X. R.

23—150, 200, 204